United States Patent
Sarel et al.

(10) Patent No.: US 12,375,481 B2
(45) Date of Patent: Jul. 29, 2025

(54) SYSTEM AND METHOD FOR OPERATING SYSTEM DISTRIBUTION AND VERSION IDENTIFICATION USING COMMUNICATIONS SECURITY FINGERPRINTS

(71) Applicant: Armis Security Ltd., Tel Aviv-Jaffa (IL)

(72) Inventors: Yuval Sarel, Tel Aviv (IL); Ben Seri, Tel Aviv (IL); Yuval Friedlander, Petah-Tiqwa (IL); Tom Hanetz, Tel Aviv (IL); Gil Ben Zvi, Hod Hasharon (IL); Ron Shoham, Tel Aviv (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 357 days.

(21) Appl. No.: 17/188,879

(22) Filed: Mar. 1, 2021

(65) Prior Publication Data

US 2022/0278984 A1 Sep. 1, 2022

(51) Int. Cl.
*G06N 5/04* (2023.01)
*G06N 20/00* (2019.01)
*H04L 9/40* (2022.01)

(52) U.S. Cl.
CPC ........... *H04L 63/0876* (2013.01); *G06N 5/04* (2013.01); *G06N 20/00* (2019.01); *H04L 63/1416* (2013.01); *H04L 63/166* (2013.01)

(58) Field of Classification Search
CPC ............. H04L 63/0876; H04L 63/1416; H04L 63/166; G06N 5/04; G06N 20/00; G06N 20/20

See application file for complete search history.

(56) References Cited

U.S. PATENT DOCUMENTS

| 2009/0172821 A1* | 7/2009 | Daira | H04W 12/122 |
| | | | 707/999.005 |
| 2015/0052595 A1* | 2/2015 | Murphy | G06F 21/44 |
| | | | 726/7 |

(Continued)

FOREIGN PATENT DOCUMENTS

WO WO-2022103630 A1 * 5/2022 ........... G06Q 10/083

OTHER PUBLICATIONS

Wazen M. Shbair et al "A Multi-Level Framework to Identify HTTPS Services" . 2016 IEEE/IFIP Network Operations and Management Symposium (NOMS 2016).*

(Continued)

*Primary Examiner* — Farid Homayounmehr
*Assistant Examiner* — Mudasiru K Olaegbe
(74) *Attorney, Agent, or Firm* — Perkins Coie LLP (57) ABSTRACT

A system and method for inferring an operating system version for a device based on communications security data. A method includes identifying a plurality of sequences in communications security data sent by the device; determining an operating system type of an operating system used by the device based on the identified plurality of sequences; applying a version-identifying model to the identified plurality of sequences, wherein the version-identifying model is a machine learning model trained to output a version identifier, wherein the applied version-identifying model is associated with the determined operating system type; and determining the operating system version of the device based on the output of the version-identifying model.

20 Claims, 4 Drawing Sheets

(56) References Cited

U.S. PATENT DOCUMENTS

| | | | |
|---|---|---|---|
| 2017/0070380 A1* | 3/2017 | Bajpai | H04L 41/0631 |
| 2018/0260214 A1* | 9/2018 | Oberheide | G06F 16/2455 |
| 2019/0102698 A1* | 4/2019 | Roberts | G06N 20/20 |
| 2019/0114360 A1* | 4/2019 | Garg | G06F 16/1794 |
| 2019/0297402 A1* | 9/2019 | Anderson | H04L 63/1441 |
| 2020/0250530 A1* | 8/2020 | Shen | H04L 67/02 |
| 2021/0185083 A1* | 6/2021 | Azaria | H04L 63/1458 |
| 2022/0188087 A1* | 6/2022 | Montag | G06F 8/60 |
| 2022/0191761 A1* | 6/2022 | Feng | G06F 9/4451 |
| 2022/0276931 A1* | 9/2022 | Chen | G06F 11/366 |

OTHER PUBLICATIONS

Wenchao Cui and Minghao Gou "Design and Implementation of a SSH Proxy System Based on B/S Architecture" 2021 J. Phys.: Conf. Ser. 2010 012020.*

* cited by examiner

SYSTEM AND METHOD FOR OPERATING SYSTEM DISTRIBUTION AND VERSION IDENTIFICATION USING COMMUNICATIONS SECURITY FINGERPRINTS

TECHNICAL FIELD

The present disclosure relates generally to determining operating system information, and more specifically to determining operating system information implicitly using data including communication security fingerprints.

BACKGROUND

Identifying the operating system of a device can be useful for many applications but is often a difficult task. In most cases, the operating system of a device is not directly or explicitly indicated anywhere that would be accessible to a third party. More specific information, like which version of the operating system is installed on the device, is also desirable and similarly not directly indicated.

Some existing solutions for attempting to estimate the operating system of a device use preset rules which associate known operating systems with corresponding criteria. However, these rules-based solutions only yield semi-reliable predictions with a low coverage rate. More specifically, these rules-based solutions are specific to a given known operating system and require manual maintenance. As a result, these rules-based solutions are not scalable.

When devices communicate, they may communicate using cryptographic protocols designed to provide communications security. These protocols allow for exchanging information privately and securely, using cryptography and agreed upon encryption techniques in order to ensure that eavesdropping devices cannot access the underlying information. Examples of communications security cryptographic protocols include Transport Layer Security (TLS) and its predecessor, Secure Sockets Layer (SSL).

When using a communications security protocol, devices negotiate in order to establish details of the connection during further communications. The communications used for these negotiations are referred to as a handshake. Examples of details that are negotiated during the handshake include which version of protocol (e.g., which version of TLS) will be used during the session, which cipher suite will be used to encrypt communications, verification of one or more participants, and establishing that the existing connection is secure before transferring more data.

Although devices may exchange information during the handshake, such information does not explicitly indicate all relevant details about the devices. Typically, the information exchanged during the handshake only includes information that is strictly necessary for establishing communications.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for inferring an operating system version for a device based on communications security data. The method comprises: identifying a plurality of sequences in communications security data sent by the device; determining an operating system type of an operating system used by the device based on the identified plurality of sequences; applying a version-identifying model to the identified plurality of sequences, wherein the version-identifying model is a machine learning model trained to output a version identifier, wherein the applied version-identifying model is associated with the determined operating system type; and determining the operating system version of the device based on the output of the version-identifying model.

Certain embodiments disclosed herein also include a non-transitory computer readable medium having stored thereon causing a processing circuitry to execute a process, the process comprising: identifying a plurality of sequences in communications security data sent by the device; determining an operating system type of an operating system used by the device based on the identified plurality of sequences; applying a version-identifying model to the identified plurality of sequences, wherein the version-identifying model is a machine learning model trained to output a version identifier, wherein the applied version-identifying model is associated with the determined operating system type; and determining the operating system version of the device based on the output of the version-identifying model.

Certain embodiments disclosed herein also include a system for inferring an operating system version for a device based on communications security data. The system comprises: a processing circuitry; and a memory, the memory containing instructions that, when executed by the processing circuitry, configure the system to: identify a plurality of sequences in communications security data sent by the device; determine an operating system type of an operating system used by the device based on the identified plurality of sequences; apply a version-identifying model to the identified plurality of sequences, wherein the version-identifying model is a machine learning model trained to output a version identifier, wherein the applied version-identifying model is associated with the determined operating system type; and determine the operating system version of the device based on the output of the version-identifying model.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

During a communications security handshake, one or more sequences of tokens may be exchanged. As an example, these sequences may include a sequence of tokens representing ciphers, a sequence of tokens representing extensions, and a sequence of tokens representing elliptic curves. It has been identified that the order of these sequences is statistically significant such that the order can be used to determine details of the operating system used by the device. Accordingly, the disclosed embodiments provide techniques for identifying such operating system details using this identified property of these token sequences.

It has further been identified that different techniques may be used to infer the operating system used by a device, and this inferred operating system may be used in combination with the data exchanged during the connections security handshake in order to infer details about the operating system such as operating system version. The disclosed embodiments provide techniques for inferring operating system version based on connections security handshakes.

The various disclosed embodiments include methods and systems for determining operating system information of a device. In accordance with the disclosed embodiments, one or more machine learning models are trained and applied to features extracted from data communicated between devices in order to determine an operating system version of an operating system used by one of the devices.

During a training phase, a set of first sequence-based machine learning models is trained to identify sequences of data using a training data set including data communicated by devices using respective operating systems. A second OS-identifying machine learning model is trained using a training data set including sequences of data. The second OS-identifying machine learning model is configured to output predicted classes and corresponding probabilities for a given sequence of data. A set of third version-identifying machine learning models is trained to classify sequences of data into versions of respective operating systems. In an embodiment, each version-identifying machine learning model is a hierarchical classifier associated with a respective type of operating system.

During an application phase, data sent from a first device to a second device is input to each of the first sequence-based machine learning models in order to output sequences. The sequences are input to the second version-identifying machine learning model in order to output classes and respective probabilities. For each output class having a respective probability above a threshold, the sequences related to the operating system represented by that class are input to a respective third version-identifying machine learning model for that operating system. Based on the output of the third version-identifying machine learning models, an inferred operating system version is determined for the device.

The inferred operating system version is stored for subsequent use. In some embodiments, the identified operating system and version can be utilized for purposes such as, but not limited to, detecting abnormal behavior and mitigating potential issues related to abnormal behavior.

The disclosed embodiments provide data related to the software utilized by a device that is not explicitly included in data transmitted by the device and, therefore, can in turn be utilized to improve other processes related to either or both of the devices. As a non-limiting example improvement, using the identified version of operating system on that device and having known behaviors associated with that operating system, activity of the device can be monitored to identify behavioral abnormalities. Such behavioral abnormalities can be mitigated (for example, by terminating communications in which a device exhibits abnormal behavior) in order to further improve the security of the connection, the devices, or both.

Because the disclosed embodiments allow for identifying operating system versions without explicit identifiers thereof or explicit rules for identifying operating system versions, the disclosed embodiments prevent a flexible and scalable approach which can be readily adapted as new operating system versions are released.

The disclosed embodiments also provide techniques for feature extraction which further improve the accuracy of the operating system version inference. More specifically, the disclosed embodiments include techniques for extracting and utilizing probabilities which are input to the machine learning model for identifying operating system versions. Using such probabilities as additional features input to the machine learning model further improves the accuracy of operating system version identification as described herein.

Additionally, such probabilities can be utilized to identify likely types of operating systems for a device, which in turn allows for filtering out potential operating system versions and, consequently, hierarchical classifiers. This allows for reducing false positives and for conserving computing resources that would be needed to apply irrelevant hierarchical classifiers.

Moreover, the disclosed embodiments provide techniques for identifying sequences using machine learning which allows for identifying sequences without requiring explicit rules defining those sequences and, therefore, provides improved operating system version identification.

Figure 1:
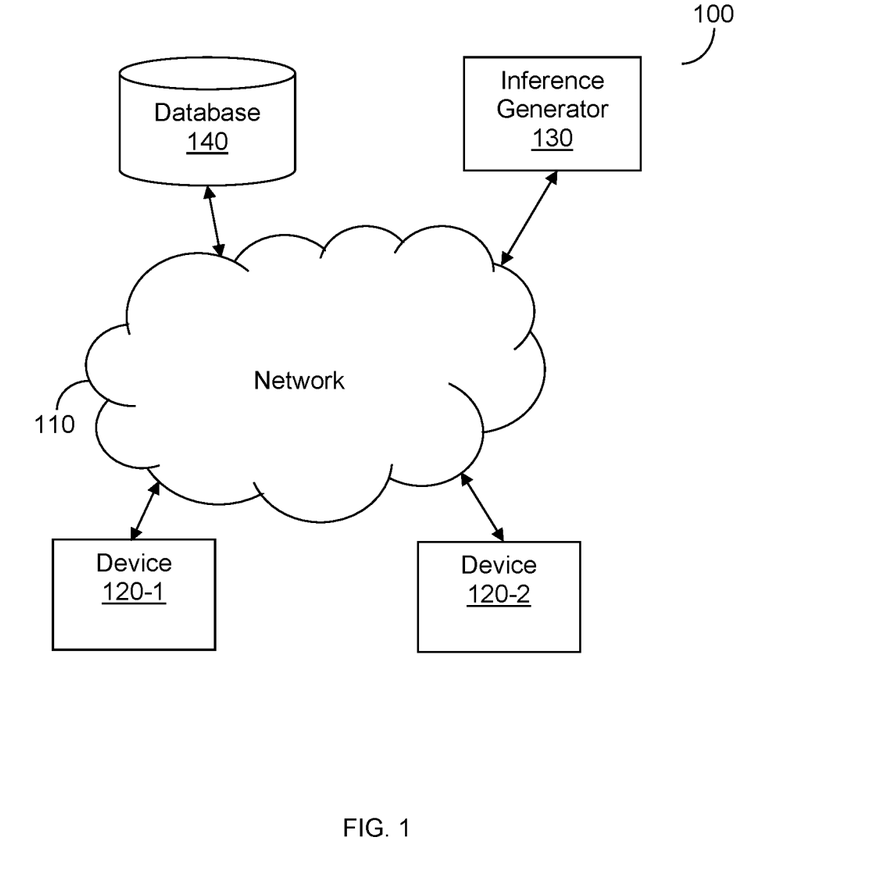
FIG. 1 is a network diagram utilized to describe various disclosed embodiments.

FIG. 1 shows an example network diagram 100 utilized to describe the various disclosed embodiments. In the example network diagram 100, communicating devices 120-1 and 120-2, an inference generator 130, and a database 140 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each of the devices 120-1 and 120-2 may be, but is not limited to, a personal computer, a laptop, a tablet computer, a smartphone, a wearable computing device, a server, or any other device configured for communications which utilize one or more communications security protocols in order to secure those communications. As a non-limiting example, each of the devices 120-1 and 120-2 is configured to establish communication details using the transport layer security (TLS) protocol.

The inference generator 130 is configured to determine inferred operating system versions of operating systems used by the device 120-1, the devices 120-2, or both, based on sequences of portions of data as described herein. To this end, the inference generator 130 is configured to train and apply machine learning models including hierarchical classifiers for determining operating system versions for respective operating systems. Each machine learning model is applied to data communicated between the devices 120-1 and 120-2, the output of another of the machine learning models, or both.

The database 140 stores data to be utilized for training and application of machine learning models as described herein. Such data may include, but is not limited to, contents of communications between the devices 120-1 and 120-2, contents of historical communications, identified sequences, operating system classes and corresponding probabilities, operating system versions, combinations thereof, and the like. In some embodiments, outputs of the inference generator (which may include intermediate outputs that are used as inputs to subsequent stages of processing) are stored in the database 140.

Figure 2:
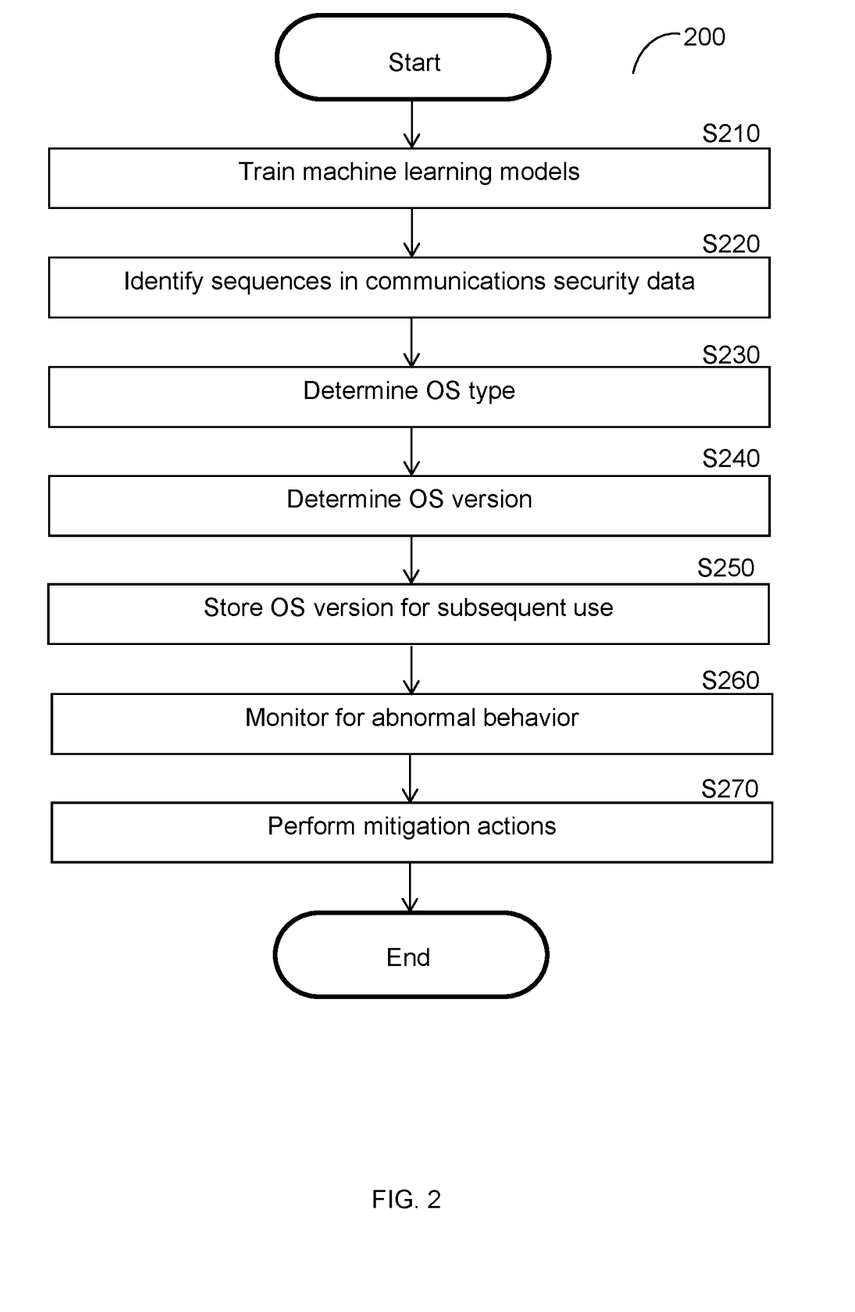
FIG. 2 is a flowchart illustrating a method for determining operating system information of a device according to an embodiment.

FIG. 2 is a flowchart illustrating a method for determining operating system of a device according to an embodiment. In an embodiment, the method is performed by the inference generator 130, FIG. 1.

At S210, machine learning models to be used for inferring operating system (OS) versions are trained. In an embodiment, the machine learning models include at least hierarchical classifiers, each of which is trained to output a version identifier of an operating system version for a respective type of operating system. In a further embodiment, the machine learning models may further include models trained to identify statistically significant sequences of data for different respective operating system types. In yet a further embodiment, the machine learning models may further include a model trained to output a probability for each of multiple classes representing potential operating system types of the device. The probability for each class represents a likelihood that the device is using an operating system of that type.

In an embodiment, S210 includes training a set of first sequence-based machine learning models to identify sequences of data using a training data set including data communicated by devices using respective operating systems during communications security handshakes. Each of the first sequence-based machine learning models is trained separately based on training data of a device using its respective operating system type or operating system version.

A communications security handshake is a process in which devices negotiate the details of communications. During the handshake, devices exchange portions of data such as tokens including proposed communication details. Such details and, therefore, the corresponding portions of data exchanged during the handshake, may include, but are not limited to, ciphers, extensions, and elliptic curves. Once the negotiating process is completed, subsequent communications between the devices are achieved in accordance with the agreed upon details. A non-limiting example communications security protocol which may be utilized for such a handshake is transport layer security (TLS).

It has been identified that certain sequences of data exchanged during the handshake are associated with certain operating systems and, more specifically, to certain versions of operating systems. Moreover, such sequences can be learned via machine learning in order to improve flexibility and accuracy of identification of such sequences without requiring manually reconfiguring rules as new operating system types and versions are released. Accordingly, training the set of first sequence-based models allows for improving sequence identification and, consequently, subsequent operating system version identification.

In a further embodiment, S210 optionally includes training a second OS-identifying machine learning model using a training data set including sequences of data. The second OS-identifying machine learning model is configured to output predicted classes and corresponding probabilities for a given sequence of data. Each class represents a potential operating system utilized by the device and the corresponding probability for each class represents a confidence that the operating system utilized by the device belongs to the respective class. In an example implementation, the second OS-identifying machine learning model may be a supervised classification model such as, but not limited to, an XGBoost classifier model.

In an embodiment, S210 further includes training a set of third version-identifying machine learning models to classify sequences of data into versions of respective operating systems. In an embodiment, each version-identifying machine learning model is a hierarchical classifier associated with a respective type of operating system.

It should be noted that, although S210 is described as including training three types of machine learning models (i.e., sequence-based models, OS-identifying models, and version-identifying models) with respect to FIG. 2, in at least some implementations S210 does not require training all three types of models. In particular, in some embodiments, the operating system of a device may be determined in a different manner, for example based on other data related to the device, using predetermined rules for operating system type identification, both, and the like. It is noted, however, that the OS-identifying machine learning model as described herein allows for further improving computer performance related to the method by improving accuracy of version identification.

At S220, sequences in communications security data exchanged between devices are identified. More specifically, the sequences are identified in communications security data sent by a first device of the devices for which an operating system version is to be determined.

In an embodiment, S220 includes applying the set of sequence-based models to features extracted from communications security data exchanged between the devices. As noted above, each sequence-based model may correspond to a respective operating system such that sequences identified using each sequence-based models are sequences which tend to indicate that the device is using the respective operating system.

In a further embodiment, the types of sequences which may be identified by each sequence-based model may include cipher sequences, extension sequences, and elliptic curve sequences. In yet a further embodiment, for each type of sequence, each sequence-based model is configured to output a probability representing the likelihood that the sequence is identified in the communications security data.

At S230, based on the sequences identified at S220, an operating system (OS) type of the device is determined. In an embodiment, the determined operating system type is an operating system type for which the corresponding probability is above a threshold. To this end, in a further embodiment, S230 includes applying the OS-identifying machine learning model using the identified sequences as input features. Non-limiting example operating system types include iOS, Android, Linux, Windows, and the like.

As noted above, in an embodiment, the output of the second OS-identifying model is a probability for each class, where each class represents a type of operating system and each probability represents the likelihood that the operating system of the first device belongs to the respective type of operating system. In a further embodiment, only operating system types having respective probabilities above a threshold are determined to be potential operating systems for the device and considered during subsequent processing.

At S240, an operating system version of the operating system used by the first device is determined. As non-limiting examples, operating system versions for the operating system type "iOS" may include "iOS 12" (i.e., iOS version 12) and "iOS 13" (i.e., iOS version 13). In an embodiment, S240 includes applying a hierarchical classifier associated with the operating system type determined at S230. In a further embodiment, determining the operating system version may be performed as described with respect to FIG. 3.

In an embodiment, multiple instances of the first device are passed through the OS-identifying model.

Figure 3:
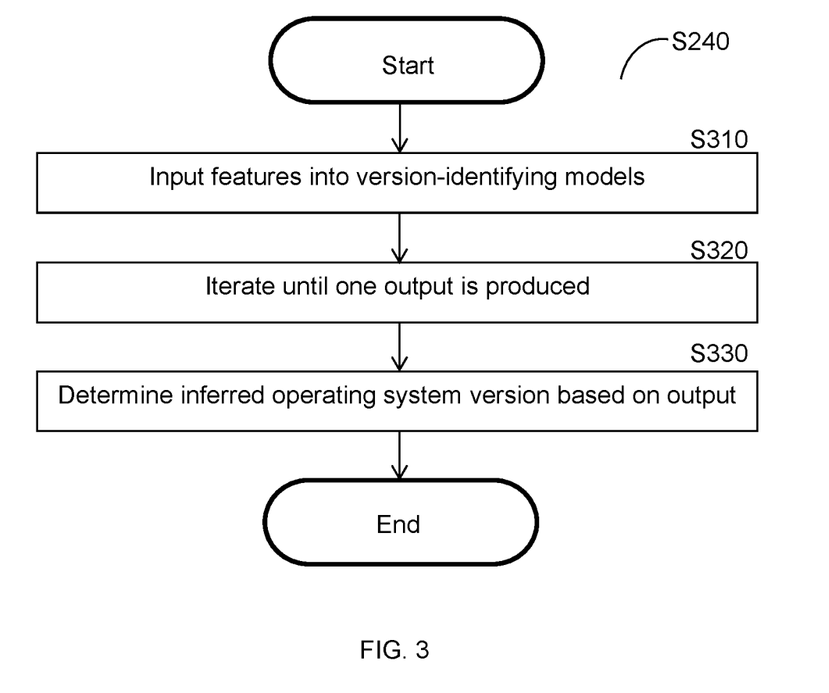
FIG. 3 is a flowchart illustrating a method for inferring an operating system version of a device using transport layer security fingerprints according to an embodiment.

FIG. 3 is a flowchart illustrating a method for estimating an operating system version of a device using transport layer security fingerprints according to an embodiment.

At S310, features are input into a version-identifying machine learning model associated with the determined operating system type. In an embodiment, each version-identifying model is a hierarchical classifier trained based on historical sequence and operating system data. As noted above, each version-identifying model is associated with a respective operating system type and is configured to output a version of its respective operating system type. Accordingly, the features input to the version-identifying model include the identified sequences associated with its respective operating system type as well as the probability determined for the operating system type.

At S320, the version-identifying model is iterated until a single output is produced by that model. The resulting output is a version of the operating system of the device. As a non-limiting example, such a version may be "iOS 13." More specifically, the early iterations of the version-identifying model are performed on specific portions of the features. As a non-limiting example, the version-identifying model may be iterated using different identified sequences as inputs for different early iterations. The results of these early iterations are combined and classified on a higher level until one output is produced.

At S330, based on the output of the version-identifying model, an inferred operating system version is determined.

It should be noted that FIG. 3 is described with the version-identifying models being iterated in parallel merely for simplicity purposes, but that the version-identifying models may equally be iterated sequentially without departing from the scope of the disclosure.

Returning to FIG. 2, at S250, the determined operating system version is stored for subsequent use. In an example implementation, the operating system version may be stored in the database 140, FIG. 1.

At optional S260, based on the operating system version determined at S240, activity of the device is monitored for abnormal behavior. In this regard, it is noted that devices having different operating systems and, more specifically, different versions of operating systems, tend to behave predictably in at least some ways. As a result, by first determining what version of which operating system is used by a device, certain normal behavior patterns can be expected such that deviations from these normal behavior patterns may be used to detect abnormal behavior. The normal behavior patterns may be explicitly defined, learned through machine learning, both, and the like. Accordingly, monitoring for abnormal behavior with respect to the determined operating system version as described above may allow for identifying abnormalities in behavior that cannot be identified without knowing the operating system version of the device, thereby improving security of the device or of other devices communicating with the device.

At optional S270, mitigation actions are performed in response to abnormal behavior being detected. The mitigation actions may include, but are not limited to, terminating a connection between the device and one or more other devices (e.g., terminating a connection between the devices 120-1 and 120-2, FIG. 1).

It should be noted that FIG. 2 is described as a single process including both training and application phases for the machine learning models. These phases can be performed at distinct times rather than the application phase occurring immediately after completion of the training phase without departing from the scope of the disclosed embodiments. Moreover, training of the machine learning models is depicted as a single step merely for simplicity, but the machine learning models may be trained at distinct times from each other without departing from the scope of the disclosure.

Figure 4:
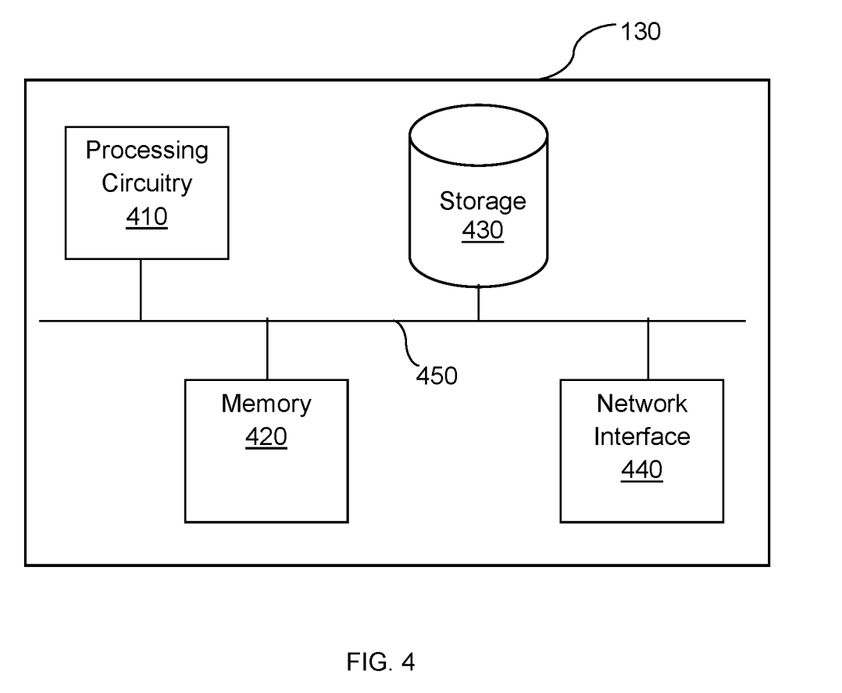
FIG. 4 is a schematic diagram of an inference generator according to an embodiment.

FIG. 4 is an example schematic diagram of an inference generator 130 according to an embodiment. The inference generator 130 includes a processing circuitry 410 coupled to a memory 420, a storage 430, and a network interface 440. In an embodiment, the components of the inference generator 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the system 130 to communicate with, for example, the database 140. Such communications may allow for retrieving data to be used for training and applying the machine learning models as described herein.

It should be understood that the embodiments described herein are not limited to the specific architecture illustrated in FIG. 4, and other architectures may be equally used without departing from the scope of the disclosed embodiments.

It should be noted that various embodiments are described with respect to inferring the operating system and operating system version of a single device merely for simplicity, and that the disclosed embodiments may be equally utilized to infer the operating system and/or operating system version of each device in a communication based on the respective data communicated by those devices. Such additional device operating system details may be inferred in parallel or in sequence.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inferring an operating system version for a device based on communications security data, comprising:

extracting a set of features from communications security data sent by a first device, wherein the communications security data comprises part of a handshake to establish an encrypted connection based on an elliptic-curve cryptography protocol;

applying a plurality of sequence-based machine-learning models without explicit rules defining sequences to identify a plurality of sequences for a corresponding plurality of lists in the features wherein the plurality of lists identifies ciphers, extension types, or elliptic curves compatible with the device;

determining an operating system type of an operating system used by the device based on the identified plurality of sequences;

iteratively applying a version-identifying model to the identified plurality of sequences, wherein the version-identifying model is a machine learning model trained to output a version identifier, wherein the applied version-identifying model is associated with the determined operating system type, wherein the version-identifying model is iterated using different identified sequences as inputs for different earlier iterations, wherein results of the earlier iterations are combined and classified to produce a single output; and determining the operating system version of the device based on the output of the version-identifying model.

2. The method of claim 1, wherein the version-identifying model is a hierarchical classifier configured to iterate over the plurality of sequences.

3. The method of claim 1, wherein the plurality of sequence-based machine learning models are applied to features extracted from the communications security data sent by the device, wherein each sequence-based machine learning model is a machine learning model associated with a respective operating system, wherein each sequence-based machine learning model is trained based on a training data set including training communications security data sent by training devices using the respective operating system.

4. The method of claim 1, wherein determining the operating system type further comprises:

applying an operating system (OS)-identifying model to the plurality of sequences, wherein the OS-identifying model is a machine learning model trained to output a plurality of probabilities, wherein each probability is associated with a respective class representing a potential operating system used by the device, wherein the version-identifying model is further applied to the plurality of probabilities.

5. The method of claim 1, wherein the plurality of sequences includes at least one of: cipher sequences, extension sequences, and elliptic curve sequences.

6. The method of claim 1, wherein each identified sequence is associated with a respective operating system type of a plurality of operating system types, wherein the determined operating system type for the device is one of the plurality of operating system types.

7. The method of claim 1, wherein the communications security data sent by the device includes data sent during a communications security handshake.

8. The method of claim 1, wherein the communications security data sent by the device is according to a transport layer security protocol.

9. The method of claim 1, further comprising:
monitoring activity of the device to detect abnormal behavior based on the determined operating system version of the device; and
performing at least one mitigation action when the abnormal behavior is detected.

10. A non-transitory computer readable medium having stored thereon instructions for causing a processing circuitry to execute a process, the process comprising:
extracting a set of features from communications security data sent by a first device, wherein the communications security data comprises part of a handshake to establish an encrypted connection based on an elliptic-curve cryptography protocol;
applying a plurality of sequence-based machine-learning models without explicit rules defining sequences to identify a plurality of sequences for a corresponding plurality of lists in the features, wherein the plurality of lists identifies ciphers, extension types, or elliptic curves compatible with the device;
determining an operating system type of an operating system used by the device based on the identified plurality of sequences;
iteratively applying a version-identifying model to the identified plurality of sequences, wherein the version-identifying model is a machine learning model trained to output a version identifier, wherein the applied version-identifying model is associated with the determined operating system type, wherein the version-identifying model is iterated using different identified sequences as inputs for different earlier iterations, wherein results of the earlier iterations are combined and classified to produce a single output; and
determining an operating system version of the device based on an output of the version-identifying model.

11. A system for inferring an operating system version for a device based on communications security data, comprising:
a processing circuitry; and
a memory, the memory containing instructions that, when executed by the processing circuitry, configure the system to:
extract a set of features from communications security data sent by a first device, wherein the communications security data comprises part of a handshake to establish an encrypted connection based on an elliptic-curve cryptography protocol;
apply a plurality of sequence-based machine-learning models without explicit rules defining sequences to identify a plurality of sequences for a corresponding plurality of lists in the features, wherein the plurality of lists identifies ciphers, extension types, or elliptic curves compatible with the device;
determine an operating system type of an operating system used by the device based on the identified plurality of sequences;
iteratively apply a version-identifying model to the identified plurality of sequences, wherein the version-identifying model is a machine learning model trained to output a version identifier, wherein the applied version-identifying model is associated with the determined operating system type, wherein the version-identifying model is iterated using different identified sequences as inputs for different earlier iteration, wherein results of the earlier iterations are combined and classified to produce a single output; and
determine the operating system version of the device based on the output of the version-identifying model.

12. The system of claim 11, wherein the version-identifying model is a hierarchical classifier configured to iterate over the plurality of sequences.

13. The system of claim 11, wherein the plurality of sequence-based machine learning models are applied to features extracted from the communications security data sent by the device, wherein each sequence-based machine learning model is a machine learning model associated with a respective operating system, wherein each sequence-based model is trained based on a training data set including training communications security data sent by training devices using the respective operating system.

14. The system of claim 11, wherein the system is further configured to:
apply an operating system (OS)-identifying model to the plurality of sequences, wherein the OS-identifying model is a machine learning model trained to output a plurality of probabilities, wherein each probability is associated with a respective class representing a potential operating system used by the device, wherein the version-identifying model is further applied to the plurality of probabilities.

15. The system of claim 11, wherein the plurality of sequences includes at least one of: cipher sequences, extension sequences, and elliptic curve sequences.

16. The system of claim 11, wherein each identified sequence is associated with a respective operating system type of a plurality of operating system types, wherein the determined operating system type for the device is one of the plurality of operating system types.

17. The system of claim 11, wherein the communications security data sent by the device includes data sent during a communications security handshake.

18. The system of claim 11, wherein the communications security data sent by the device is according to a transport layer security protocol.

19. The system of claim 11, wherein the system is further configured to:
monitor activity of the device to detect abnormal behavior based on the determined operating system version of the device; and
perform at least one mitigation action when the abnormal behavior is detected.

20. The method of claim 1, wherein the device is a first device, wherein the plurality of sequences of communications security data sent by the first device are sent to a second device, and wherein determining the operating system version of the first device.

* * * * *